(12) United States Patent
Grundy et al.

(10) Patent No.: US 9,732,524 B2
(45) Date of Patent: Aug. 15, 2017

(54) AERATED FIBER CEMENT BUILDING PRODUCTS AND METHODS OF MAKING THE SAME

(71) Applicant: James Hardie Technology Limited, Dublin (IE)

(72) Inventors: Sarah Grundy, Rosehill (AU); Kelvin Lau, Rosehill (AU); Xiangyuan Liu, Fontana, CA (US); Thomas Patrick Mueller, Fontana, CA (US); Joe Zhou Peng, Fontana, CA (US); Steven Terzian, Rosehill (AU)

(73) Assignee: James Hardie Technology Limited, Dublin (IE)

( * ) Notice: Subject to any disclaimer, the term of this patent is extended or adjusted under 35 U.S.C. 154(b) by 0 days.

(21) Appl. No.: 14/555,528

(22) Filed: Nov. 26, 2014

(65) Prior Publication Data

US 2015/0086773 A1 Mar. 26, 2015

Related U.S. Application Data

(63) Continuation-in-part of application No. 14/113,569, filed as application No. PCT/US2012/035593 on Apr. 27, 2012.

(Continued)

(51) Int. Cl.
*E04C 1/40* (2006.01)
*B32B 13/02* (2006.01)
(Continued)

(52) U.S. Cl.
CPC .................. *E04C 1/40* (2013.01); *B32B 5/18* (2013.01); *B32B 13/02* (2013.01); *B32B 13/04* (2013.01);
(Continued)

(58) Field of Classification Search
CPC ... C04B 38/00–38/106; C04B 38/0061; Y10T 428/249968
See application file for complete search history.

(56) References Cited

U.S. PATENT DOCUMENTS 4,872,913 A 10/1989 Dunton et al.
5,002,620 A 3/1991 King
(Continued)

FOREIGN PATENT DOCUMENTS

WO WO 9420274 A1 * 9/1994 ............... B28B 1/00
WO WO 2012/149421 11/2012

OTHER PUBLICATIONS

International Search Report and Written Opinion for corresponding PCT Application No. PCT/US2012/35593, filed Apr. 27, 2012, dated Sep. 21, 2012, 14 pages.

*Primary Examiner* — Aaron Austin
*Assistant Examiner* — Jasper Saberi
(74) *Attorney, Agent, or Firm* — Knobbe Martens Olson & Bear, LLP

(57) ABSTRACT

Disclosed herein are low density fiber cement articles, such as fiber cement building panels and sheets, comprised of multiple overlaying fiber cement substrate layers having small and uniform entrained air pockets and low density fillers distributed throughout. The combination of entrained air pockets and low density fillers provide a low density fiber cement matrix with physical and mechanical properties similar to comparable low density fiber cement matrix without entrained air pockets.

11 Claims, 13 Drawing Sheets

Related U.S. Application Data

(60) Provisional application No. 61/479,814, filed on Apr. 27, 2011.

(51) Int. Cl.

| | | |
|---|---|---|
| *B32B 5/18* | (2006.01) | |
| *E04C 2/04* | (2006.01) | |
| *E04C 2/06* | (2006.01) | |
| *C04B 28/02* | (2006.01) | |
| *B32B 38/00* | (2006.01) | |
| *B32B 13/04* | (2006.01) | |
| *B32B 5/32* | (2006.01) | |
| *C04B 111/00* | (2006.01) | |
| *C04B 111/40* | (2006.01) | |

(52) U.S. Cl.
CPC .............. *C04B 28/02* (2013.01); *E04C 2/049* (2013.01); *E04C 2/06* (2013.01); *B32B 5/32* (2013.01); *B32B 13/045* (2013.01); *B32B 2038/0076* (2013.01); *B32B 2260/044* (2013.01); *B32B 2305/02* (2013.01); *B32B 2307/72* (2013.01); *B32B 2315/06* (2013.01); *B32B 2419/00* (2013.01); *C04B 2111/00612* (2013.01); *C04B 2111/40* (2013.01); *Y02W 30/97* (2015.05); *Y10T 428/249968* (2015.04)

(56) References Cited

U.S. PATENT DOCUMENTS

| | | | | |
|---|---|---|---|---|
| 5,641,584 | A  * | 6/1997  | Andersen | B28B 1/00 |
| | | | | 106/675 |
| 5,656,733 | A  * | 8/1997  | Suchanec | C07G 1/00 |
| | | | | 524/72 |
| 5,902,441 | A | 5/1999 | Bredt et al. | |
| 6,290,769 | B1 * | 9/2001 | Carkner | C04B 28/14 |
| | | | | 106/672 |
| 6,346,146 | B1 * | 2/2002 | Duselis | C04B 18/021 |
| | | | | 106/470 |
| 6,485,560 | B1 * | 11/2002 | Scherer | C04B 28/02 |
| | | | | 106/672 |
| 6,716,293 | B2 | 4/2004 | Taymourian et al. | |
| 2004/0168615 | A1 | 9/2004 | Luo et al. | |
| 2004/0206276 | A1 * | 10/2004 | Hill | C04B 18/08 |
| | | | | 106/708 |
| 2005/0212163 | A1 | 9/2005 | Bausinger et al. | |
| 2006/0112863 | A1 | 6/2006 | Orange et al. | |
| 2008/0141908 | A1 | 6/2008 | Peng et al. | |
| 2008/0203365 | A1 * | 8/2008 | Gleeson | C04B 28/04 |
| | | | | 252/601 |

* cited by examiner

SEM Air Bubble Morphology

US 9,732,524 B2

AERATED FIBER CEMENT BUILDING PRODUCTS AND METHODS OF MAKING THE SAME

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

Embodiments of the present disclosure relate to lightweight, low-density fiber cement material compositions and methods of manufacture.

Description of the Related Art

Fiber cement based building products, such as fiber cement sheets and panels, have been widely used in building construction. Efforts have been made to develop various low cost methods to reduce the density and weight of the fiber cement while maintaining desirable performance characteristics of the material. For example, low density additives, such as ceramic microspheres, have been incorporated in fiber cement. The additives are generally selected to reduce the density of the fiber cement without impairing the performance characteristics of the final product in both installation and lifetime durability and performance.

It is, however, particularly challenging to develop suitable low density additives for fiber cement building sheets or panels comprised of multiple overlaying substrate layers because of the harsh processing conditions associated with making such products. In particular, most low density additives have difficulty surviving the physical and mechanical forces imparted by the Hatschek process, which is widely used for manufacturing cellulose fibers reinforced cement sheets and panels. The low density additives selected would have to withstand the high pressure, forces, and temperature encountered through the Hatschek process.

While air entrainment is a method that can be used to reduce the density of concrete, the technique cannot be successfully and consistently applied to aeration of fiber reinforced cementitious sheets or panels for which predictable air void content and distribution are desired. In fact, numerous studies have documented the difficulties in predicting air void content of aerated uncured concrete when subject to forces or pressure. High pressure imparted on air pockets, bursting of voids by vacuum, and rupture of voids by impact forces are some of the mechanisms for air void losses in pumping aerated concrete. Thus, even though the concept of aerating concrete is known, it has not been successfully applied to producing low density fiber cement panels or sheets because of the inconsistencies in the number, distribution, and size of air voids formed by conventional air entrainment techniques. Accordingly, there is still a need for improved aeration methods and materials for manufacturing fiber reinforced panels or sheets with consistent and evenly distributed air voids.

SUMMARY OF THE INVENTION

The formulations, materials, articles, and methods of manufacture of this disclosure each have several aspects, no single one of which is solely responsible for its desirable attributes.

Any terms not directly defined herein shall be understood to have all of the meanings commonly associated with them as understood within the art. Certain terms are discussed below, or elsewhere in the specification, to provide additional guidance to the practitioner in describing the compositions, methods, systems, and the like of various embodiments, and how to make or use them. It will be appreciated that the same thing may be said in more than one way. Consequently, alternative language and synonyms may be used for any one or more of the terms discussed herein. No significance is to be placed upon whether or not a term is elaborated or discussed herein. Some synonyms or substitutable methods, materials and the like are provided. Recital of one or a few synonyms or equivalents does not exclude use of other synonyms or equivalents, unless it is explicitly stated. Use of examples in the specification, including examples of terms, is for illustrative purposes only and does not limit the scope and meaning of the embodiments herein.

The preferred embodiments of the present disclosure provide a building article which includes a plurality of thin overlaying fiber cement substrate layers. Each of the overlaying fiber cement substrate layer is bonded to an adjacent overlaying substrate layer thereby forming a fiber cement matrix. The building article further includes a plurality of air voids that are defined by air pockets entrained in the fiber cement matrix such that the air voids are formed directly in the fiber cement matrix with no material separating the air voids from the fiber cement matrix. The air voids are dispersed uniformly throughout the fiber cement matrix to reduce the density of the fiber cement matrix such that the cumulative volume of the air voids is greater than 3% of the volume of the fiber cement matrix. In some embodiments, the air voids also have an average diameter greater than 20 microns. In one embodiment, the average diameter of the air voids is between 20 microns and 100 microns. In yet another embodiment, the average diameter of air voids is between 20 microns and 50 microns, preferably between 20 microns and 40 microns, preferably between 30 microns and 40 microns. In another embodiment, the cumulative volume of the air voids is between 5% to 20% by volume of the fiber cement matrix. In yet another embodiment, the cumulative volume of air voids is between 10% to 20% by volume. In yet another embodiment, the density of the fiber cement matrix is between 1.0 to 1.3 grams per cubic centimeter (g/cc), or between 1.2 to 1.3 g/cc in some other embodiments. In yet another embodiment, at least 90% of the air voids are closed-cell. In yet another embodiment, each overlaying fiber cement substrate layer has a thickness of between 20 to 450 microns. In yet another embodiment, the fiber cement substrate layers include cellulose fibers.

The preferred embodiments of the present disclosure further provide a fiber cement formulation which includes a hydraulic binder, cellulose fibers, and an air entrainment agent. Preferably, the air entrainment agent comprises 0.1%-2% by weight of the formulation, or in some implementations, 0.3%-2% by weight. In one embodiment, the air entrainment agent comprises a vinsol resin. In another embodiment, the air entrainment agent is selected from the group consisting of sodium vinsol resin, sodium benzene sulfonate, benzenesulfonic acid, sodium substituted benzene sulfonate, and combinations thereof. In yet another embodiment, the air entrainment agent is selected from the group consisting of salts of wood resins, synthetic detergents, salts of sulfonated lignin, salts of petroleum acids, salts of proteinaceous material, fatty and resinous acid and their salts, alkylbenzene sulfonates, salts of sulfonated hydrocarbons, and combinations thereof. In yet another embodiment, the air entrainment agent is selected from the group consisting of wood resins, sulfonated hydrocarbons and combinations thereof. In yet another embodiment, the air entrainment agent comprises a sacrificial filler, such as a blowing agent.

The preferred embodiments of the present disclosure further provide a method of entraining air in a fiber cement panel comprising multiple overlays of substrate layers. The method includes the steps of creating air bubbles in a aqueous fiber cement slurry, depositing the fiber cement slurry as thin fiber cement films on a plurality of sieve cylinders that are rotated through the fiber cement slurry. The air bubbles are distributed uniformly in the thin fiber cement films. The method further includes the steps of transferring a series of sequential layers of the thin fiber cement films to a belt so as to build a thicker fiber cement layer, removing water from the thicker fiber cement layer, and curing the thicker fiber cement layer. In one embodiment, the air bubbles are created in the aqueous fiber cement slurry by adding an aerating agent directly to the fiber cement slurry and vigorously mixing the fiber cement slurry. In another embodiment, the air bubbles are created in the aqueous fiber cement slurry by vigorous premixing an aerating agent in water to create a foam mixture and then adding the foam mixture to the fiber cement slurry.

The preferred embodiments of the present disclosure further provide a fiber cement formulation comprising less than 50% by weight of a siliceous aggregate, about 25%-38% by weight of a hydraulic binding agent; about 5%-15% by weight of cellulose fibers; about 1.5%-3.5% by weight of microspheres; about 3%-8% by weight of expanded perlite, and about 0.1%-0.5% by weight an air entrainment agent. In one embodiment, the formulation comprises about 1.5% by weight of the microspheres, about 3.5% by weight of the expanded perlite, and about 0.5% by weight of the air entrainment agent. In another embodiment, the formulation comprises about 3.5% by weight of the microspheres, about 3.5% by weight of the expanded perlite, and about 0.5% by weight of the air entrainment agent.

The preferred embodiments of the present disclosure further provide a building article comprising a plurality of thin overlaying fiber cement substrate layers, wherein each of the overlaying fiber cement substrate layer is bonded to an adjacent overlaying substrate layer thereby forming a fiber cement matrix. The building article further comprises a first plurality of filler particles having a first density and incorporated in the fiber cement matrix, wherein the first plurality of filler particles comprises about 0.1%-5% by volume of the fiber cement matrix. The building article further comprises a second plurality of filler particles having a second density and incorporated in the fiber cement matrix, wherein the second plurality of filler particles have a density less than the density of the first plurality of filler particles. The building article further comprises a plurality of air voids defined by air pockets entrained in the fiber cement matrix such that the air voids are formed directly in the fiber cement matrix, wherein the air voids comprise about 3%-20% by volume of the fiber cement matrix, wherein the air voids are closed cell. In one embodiment, the first plurality of filler particles comprises microspheres. In another embodiment, the second plurality of filler particles comprises perlite. In yet another embodiment, the air voids have an average diameter greater than 20 microns. In yet another embodiment, the average diameter of the air voids is between 20 microns to 100 microns.

The preferred embodiments of the present disclosure further provides a fiber cement formulation comprising a binding agent which comprises 5%-80% by weight of the total weight of the formulation, cellulose fibers which comprises 5%-15% by weight of the total weight of the formulation, a first filler comprising 1%-15% by weight of the total weight of the formulation, a second filler comprising 1%-10% by weight of the total weight of the formulation, wherein the second filler has a density less than that of the first filler, and wherein an air entrainment agent comprising 0.6%-5.0% by weight of the total weight of the formulation.

DETAILED DESCRIPTION OF THE PREFERRED EMBODIMENT

Disclosed herein are low density fiber cement articles comprised of multiple overlaying fiber cement substrate layers having small and uniform entrained air pockets distributed throughout. Also disclosed herein are air entrainment systems and methods for manufacturing aerated low density fiber cement panels with consistent air void content and uniform air void distribution. Also disclosed herein are air entrainment technologies adapted to work in conjunction with the Hatschek process to produce aerated fiber cement articles having controlled air void content and distribution.

Figure 1:
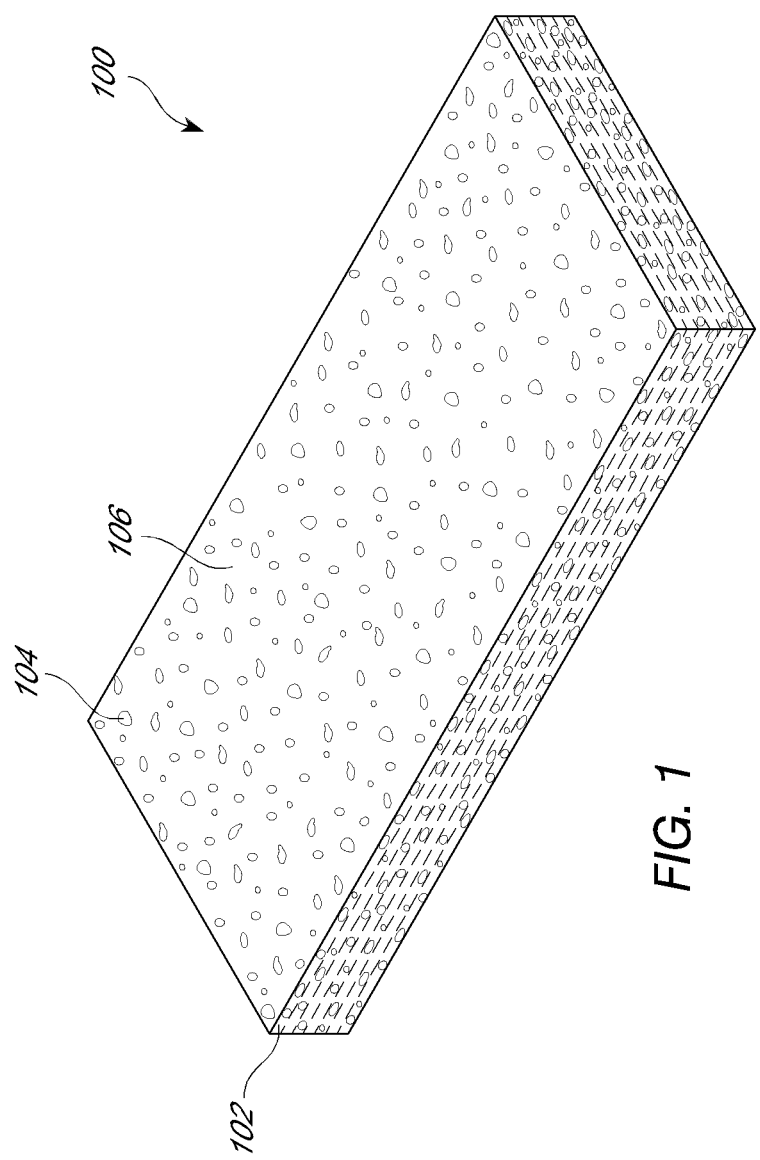
FIG. 1 is a schematic illustration of a low-density fiber cement article according to one embodiment of the present disclosure.

FIG. 1 illustrates one embodiment of a low density aerated fiber cement article 100 of the present disclosure. The fiber cement article 100 includes a plurality of overlaying fiber cement substrate layers 102, which together form a fiber cement matrix 106. As shown in FIG. 1, a plurality of air voids 104 are formed in the fiber cement matrix 106 by air entrained in the matrix 106. The air voids 104 are preferably sized within a pre-selected range and are uniformly distributed throughout the fiber cement article 100. In one implementation, the diameter of the air voids 104 is greater than 20 microns (μm), preferably between about 20 μm to 100 μm. In another implementation, the average diameter of the air voids 104 is between about 20 μm to 60 μm. In another implementation, the air voids 104 are more than 5% by volume of the fiber cement article 100, preferably between about 5%-20% by volume, preferably between about 5%-10% by volume, preferably between about 9.2% by volume.

Figure 2:
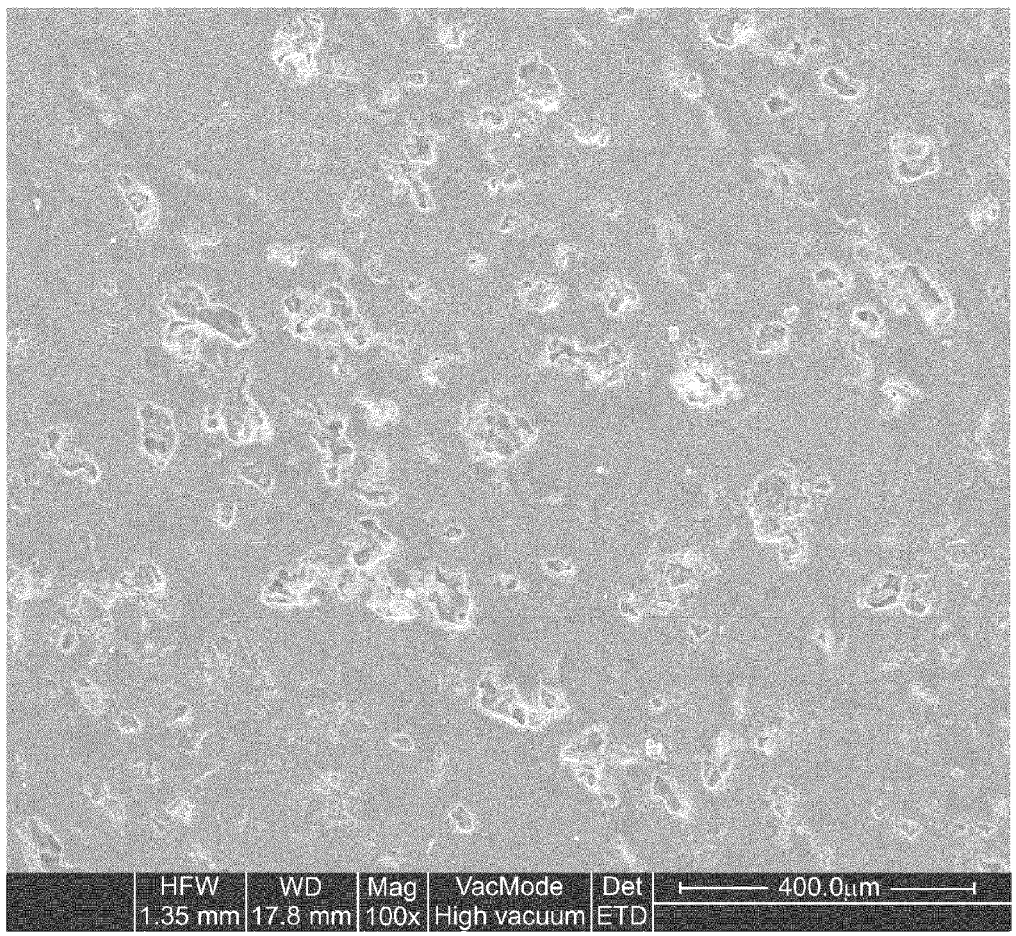
FIG. 2 is a SEM photo of voids dispersed throughout the fiber cement article of FIG. 1 shown at 100× magnification.
Figure 3:
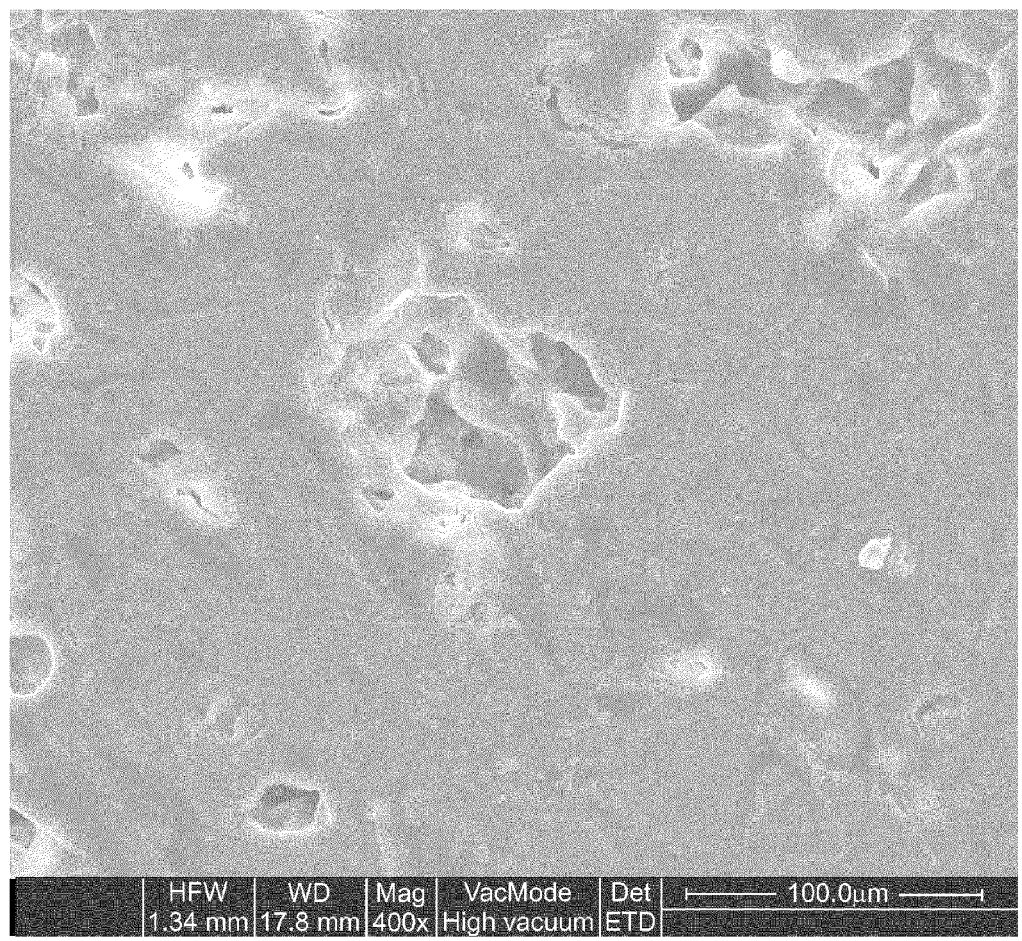
FIG. 3 is a SEM photo of voids dispersed throughout the fiber cement article of FIG. 1 shown at 400× magnification.
Figure 4:
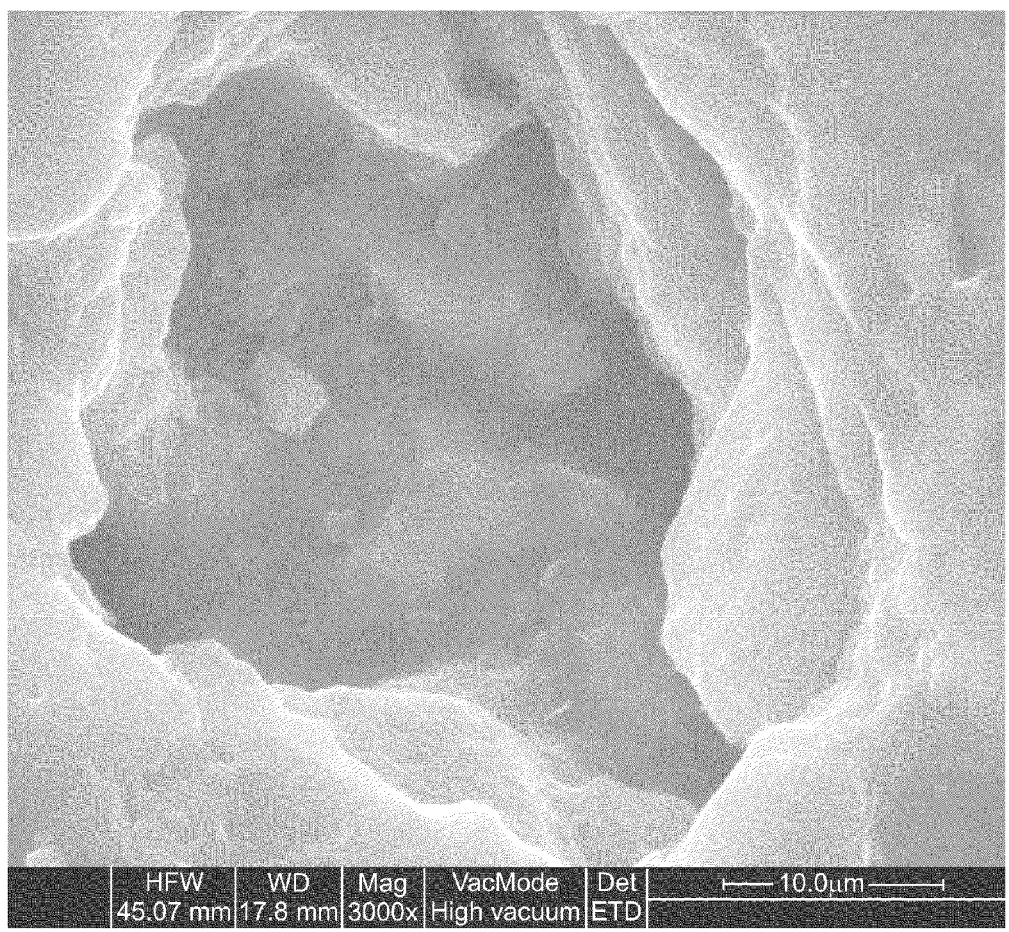
FIG. 4 is a SEM photo of the structure of a single air void of the fiber cement article of FIG. 1.

FIG. 2 is a SEM photo of air voids 104 dispersed throughout the fiber cement matrix 106 shown at 100× magnification. FIG. 3 is a SEM photo of air voids 104 shown at 400× magnification. FIG. 4 is a SEM photo illustrating the structure of a single air void 104 shown at 3000× magnification. As shown in the SEM photos, the air voids 104 formed in the fiber cement matrix 106 are generally mixtures of single and clusters of air bubbles. Unlike low-density additives such as microspheres, the air voids 104 are air pockets formed directly in the fiber cement matrix by air entrainment such that the walls defining each void is part of the fiber cement matrix. The air voids are preferably closed cell voids that do not form continuous air channels with adjacent voids. In some embodiments, at least 50%, 60%, 70%, 80%, 90%, or over 90% of the air voids in the article are closed cell voids. The shape and volume of the voids are preferably determined by the amount of air entrained in the fiber cement article. While air entraining techniques have been used to aerate concrete, it is very difficult to form uniformly distributed predominantly closed cell air voids in fiber cement panels or sheets using conventional concrete aeration techniques.

One of the challenges in forming uniformly distributed, closed cell air voids with the desired morphology in fiber cement panels or sheets is the difficulty in entraining air bubbles in the fiber cement that can survive the Hatschek process intact. The Hatschek process is widely used as a commercially viable method for making fiber cement panels or sheets with multiple overlaying substrate layers. To the best of the inventors' knowledge, aeration of fiber cement building sheets produced by the Hatschek process has never been considered as a viable process for forming uniform air voids because of the difficulty in producing air bubbles or pockets in the low solid content slurry and the bursting of air bubbles due to the numerous vigorous processing steps of the Hatschek process. Some of the processing steps that present obstacles to uniform air bubble formation are the slurry agitation, pumping, and filtering steps; the fiber cement film generation and fiber cement layer buildup steps; the high vacuum treatment of the thicker fiber cement layer and multilayer fiber cement green sheet; the high nip pressure and density increasing roll pressures on the green sheet; and the high pressure long autoclaving curing step.

Furthermore teachings from the aeration of concrete, which typically has water to cement ratios of less than 1, provide no guidance in determining whether or not the aeration of fiber cement building sheets produced by the Hatschek process would be feasible. For example, studies have shown difficulties in predicting the air content of aerated uncured concrete when subject to forces or pressure. Some have recommended against pumping air-entrained concrete at pressures in excess of 300 psi. Additionally, the effect of air entrainment additives on concrete cement is difficult to predict because of the numerous factors affecting performance. For example, excessive vibration can result in as much as 50% of entrained air being lost after three minutes of vibration; very fine (<150 μm) and coarse (>1200 μm) aggregates decrease air content, but aggregates between 150-1200 μm increase air content; and an increase in concrete temperature will significantly decrease the air content.

The size of the air bubbles present in the uncured concrete cement can also be affected by the forces imposed on it. Suction and dissolution that occur in pumping concrete could result in very few, if any, air bubbles with diameters below 50 μm being present afterwards. Suction occurs in pumping when the wet concrete is subject to a negative pressure brought on by vacuum when the pump piston chamber fills with the wet concrete paste. Dissolution occurs when the wet concrete paste is subject to pressure with the smaller air bubbles dissolving in water but not re-forming when the wet concrete paste is depressurized. Furthermore the current knowledge in the field of entrained air in fresh uncured concrete paste appears to be that the solubility of the entrained air is the same as that for free air and water. As such, based on Henry's Law, a fresh concrete paste that is subject to a pressure of 400 psi will likely dissolve a total amount of air comprising 52% of water volume present.

Accordingly, as explained above, to the best of the inventors' knowledge, there is no information from the aeration of concrete and the properties of fresh concrete paste that teaches that the aeration of fiber cement building sheet or panel with multiple overlaying substrate layers made using a Hatschek process would be technically feasible. Given the pressures, forces and temperatures encountered by the material processed through the Hatschek process, all previous low cost method of reducing the density of fiber cement building sheets and panels have been based on the addition of a low density additive, such as hollow ceramic or glass microspheres.

The present disclosure provides various embodiments of fiber cement articles having multiple overlaying substrate layers with air pockets distributed throughout. Preferably, the fiber cement article is made using a Hatschek process. In some embodiments, air pockets are introduced into the matrix by air entrainment during the manufacturing process of the fiber cement article. In other preferred embodiments, air pockets are introduced by the use of sacrificial materials in the fiber cement formulation wherein the materials disintegrate during the manufacturing process, leaving air pockets within the matrix of the end products. The fiber cement article may be a panel or a sheet and may be used as a building product.

As discussed in greater detail below, air entrainment according to preferred embodiments of the disclosure may be achieved by vigorous mixing of the formulation slurry in the Hatsheck process to produce air bubbles, coupling with the use of suitable aerating agents for bubble stability. In some preferred embodiments, the mixing condition is adjusted so that air bubbles are substantially within the 20 to 100 μm in diameter. It has been found that higher mixing rates produce smaller bubble size. In some embodiments, air bubbles are pre-produced as a foam, using a high sheer foam generated pump, before being introduced into the slurry.

Aerating agents as used herein can be chemicals or compounds that have the ability to help bubble generation and/or bubble stabilization within the Hatschek process. In some embodiments, these chemicals can be long chain polymers, acting as surfactants to strengthen the bubble shells. While there are many types of long chain polymers, the selection of suitable aerated agents for cellulose fiber cement is not obvious. The process water in Hatschek process for fiber cement product typically contains dissolved form of cements such as Calcium ($Ca^{2+}$), Sodium ($Na^+$), Potassium ($K^+$), and Sulfate ($SO_4^-$). Thus, the process water is high in pH and selected aerating agents must be able to survive in a high pH environment. In some embodiments, preferred aerating agents are cationic surfactants made with ammonium substitute, anionic surfactant such as wood resin, fatty acid salt or synthetic detergent, with carboxylate group (R—COO—), sulfate group (R—$SO_4$—) and sulfonate group (R—$SO_3$—)). More preferred aerated agents are sodium vinsol resin and/or sodium benzene sulfonate. In some embodiments, aerating agents are used in the amount of between 0.1% to 5% by weight or 0.3% to 2% by weight of the total fiber cement formulation. In more preferred embodiments, the amount of aerating agents used is 1% to 3% by weight. In some implementations, aerating agents are used in conjunction with other low density additives, such as microspheres, to reduce the density of fiber cement article. In one implementation, the aerating agents comprise about 0.13% by weight of the total fiber cement formulation and microspheres comprise about 1% by weight of the total fiber cement formulation.

Other preferred embodiments utilize suitable sacrificial materials or fillers to produce the air voids in the fiber cement matrix. The sacrificial materials or fillers are selected for their ability to disintegrate during the Hatschek process, leaving air pockets in the matrix of the end product. In some preferred implementation, the sacrificial fillers can be starch, ammonium carbonate and/or sodium bicarbonate by consideration of cost efficiency. Sacrificial material is preferably introduced into the formulation in a finely ground form so that it can be mixed and distributed throughout the formulation during the manufacturing process, thus leaving well distributed air pockets within the matrix of the end product. Preferred particle sizes of the sacrificial materials are less than 250 μm (60 mesh).

Concrete Air Entrainment Additives (AEA)

In some implementations, certain concrete air entrainment additives (AEA) are selected and modified for fiber cement sheets or panels formed by the Hatschek process. There are four commercially available types of AEAs used in the concrete cement industry: wood resins, synthetic detergents, petroleum acid salts, and fatty acids salts. Laboratory tests on the foam production from commercially available AEAs mixed with highly alkaline fiber cement processing water were performed to determine whether any of the AEAs could be used as a potential air entrainment additive for fiber cement sheets and panels. The test was conducted using a mixer (KitchenAid 325) with 500 ml of highly alkaline processing water from a fiber cement Hatschek manufacturing process and 4 grams of the selected AEA being mixed in a bowl at gear 8 of the mixer for 10 minutes. The foaming ability of the AEAs was measured by measuring the height of the resulting foam from the base of the mixing bowl.

TABLE 1

Foam test for AEA in highly alkaline fiber cement processing water.

| AEA type | Commercial Name | Detailed Description of AEA | Foaming (mm) |
| --- | --- | --- | --- |
| Wood resins | MB-VR | Sodium vinsol resin | 137.2 |
|  | Polychem VR | Sodium vinsol resin | 100 |
|  | Super Air Plus | Powder VR | no foam |
| Petroleum salts | Polychem AE | Substituted benzene sulfonate (Na salt) | 73.75 (unstable) |
|  | NASA HS 90 | Sodium benzene sulfonate | 118.13 |
|  | Micro Air | Sodium olefin sulfonate | no foam |
|  | Airen S | Benzenesulfonic Acid (Na salt) | 85 |
| Fatty acid salts | Eucon Air 40 | Tall oil. PCMC. Glycol ether | no foam |
|  | Hydrophobe | Complex carbohydrate, polyalcohols, etc. | no foam |
| Synthetic detergents | Chemical | Sodium lauryl sulfate | no foam |

As shown in Table 1, the fatty acids salt and the synthetic detergent AEAs were deactivated in highly alkaline fiber cement process water with no air bubble formation. Sodium vinsol resin and sodium benzene sulfonate successfully produced foam from the highly alkaline fiber cement processing water.

A cement hydration test was conducted using differential calorimeter method on cement slurry having a water to slurry ratio (w/s ratio) of 0.4. The test showed that sodium benzene sulfonate was a strong cement hydration retarder with a 0.5% by weight addition to cement, which resulted in the cement not setting within 72 hours. On the other hand, sodium vinsol resin had little effect on cement hydration. Since the process water for fiber cement product has a high in pH due to its constituents, additional laboratory tests were conducted and it was found that sufficient and controllable levels of entrained air were difficult to attain with most concrete AEAs.

To further assess why the fiber cement process water prevented most concrete AEAs from foaming, the following tests were performed using Micro Air for sodium olefin sulfonate, which did not foam with the fiber cement processing water, and sodium vinsol resin. The test and measurements are the same as in the fiber cement processing water test except the amount of AEA was reduced by 50% to 2 grams of the AEA in question.

TABLE 2

AEA foaming ability in different alkaline water

| AEA | Type | Solution | Foaming (mm) |
| --- | --- | --- | --- |
| Micro Air | Sodium olefin sulfonate | Fresh water (pH 7) | Good (73 mm) |
| Micro Air | Sodium olefin sulfonate | NaOH water (pH 13) | Good (73 mm) |
| Micro Air | Sodium olefin sulfonate | $Ca(OH)_2$ water (pH 13) | No foaming (35 mm) |
| MB-VR | Sodium vinsol resin | Fresh water (pH 7) | Good (76 mm) |
| MB-VR | Sodium vinsol resin | NaOH water (pH 13) | Good (76 mm) |
| MB-VR | Sodium vinsol resin | $Ca(OH)_2$ water (pH 13) | Good (76 mm) |

From the results of Table 2, it appears that the presence of lime in the process water deactivates the Micro Air AEA from foaming. Accordingly for an AEA to potentially work in the fiber cement articles, the AEA needs to work in high pH, and possibly high $Ca^+$ ion concentrations.

Aerated Fiber Cement Sheets Using Sodium Vinsol Resin as an Additive

Fiber cement building sheets made by the Hatschek process with the addition of sodium vinsol resin was conducted and a separate trial with additions of hollow microspheres for comparison. It was found that 0.5% concentration of sodium vinsol resin addition to the formulation slurry for fiber cement produced the same fiber cement building sheet density as a formulation using 3% of hollow microspheres. The product performance of fiber cement building sheets using sodium vinsol resin as an additive is shown in Table 3:

TABLE 3

Fiber cement building sheet performance comparison

| Sodium vinsol resin as percent of total solids in slurry | MoR | ILB | Moisture Movement (Pre-Carb/Post-carb) | Density |
|---|---|---|---|---|
| 0% (control) | 10.1 | 1.7 | 0.18/0.53 | 1.28 |
| 0.1% | 9.7 | 1.43 | 0.18/0.53 | 1.25 |
| 0.5% | 9.4 | 1.4 | 0.18/0.51 | 1.23 |

A separate study using fiber cement building sheets produced by the Hatschek process and using 2% sodium vinsol resin produced an average fiber cement product density 1.15 g/cm$^3$. Further scanning electron microscope (SEM) analysis of the resulting fiber cement with aeration shows the air bubble particle size in the fiber cement building sheets to range between 20 μm to 100 μm. In addition, SEM analysis also shows that although the morphology of the air bubbles appear to be irregular, possibly due to the nip pressure, the entrained air bubbles remain unbroken and isolated in fiber cement sheet without the presence of air channels, which might occur due to excessive vacuuming forces. Also analysis of the fiber cement building sheets found the overall air pockets accounted for about 9.2% of the board by volume with the entrained air distributed evenly throughout.

Figure 5:
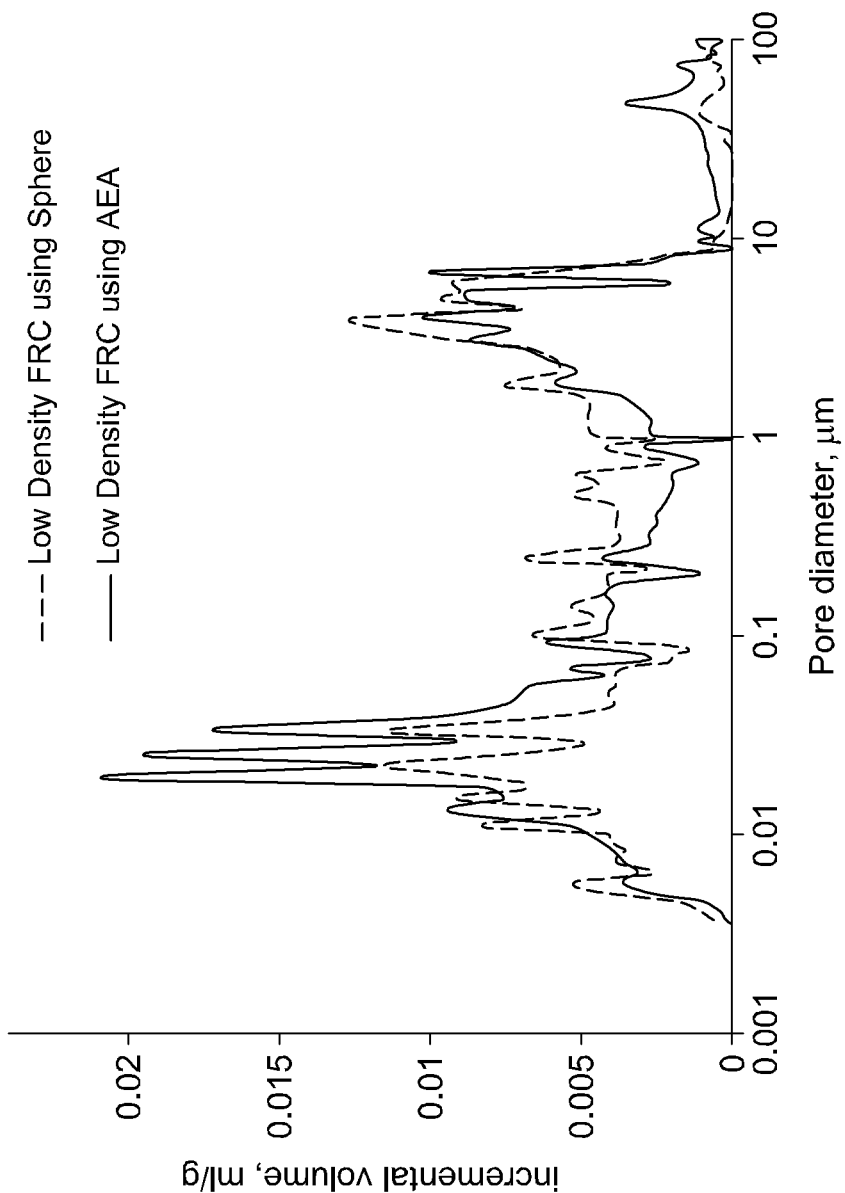
FIG. 5 shows a comparison of pore diameter distribution of low density fiber cement product of a preferred embodiment and equivalent low density fiber cement product having ceramic microspheres as additive.
Figure 6:
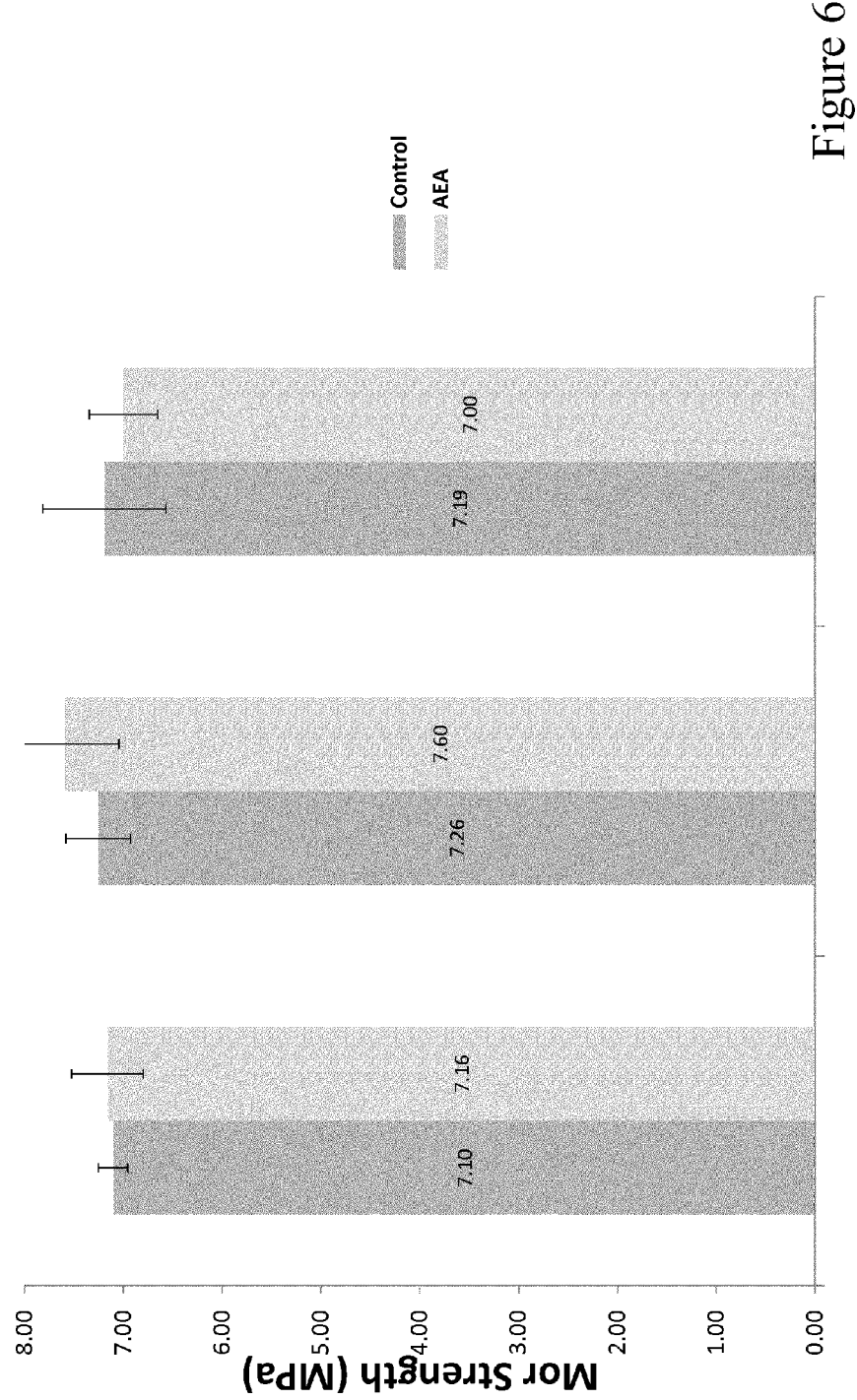
FIG. 6 illustrates the results of MOR testing of an embodiment of a product as compared to a control product.
Figure 7:
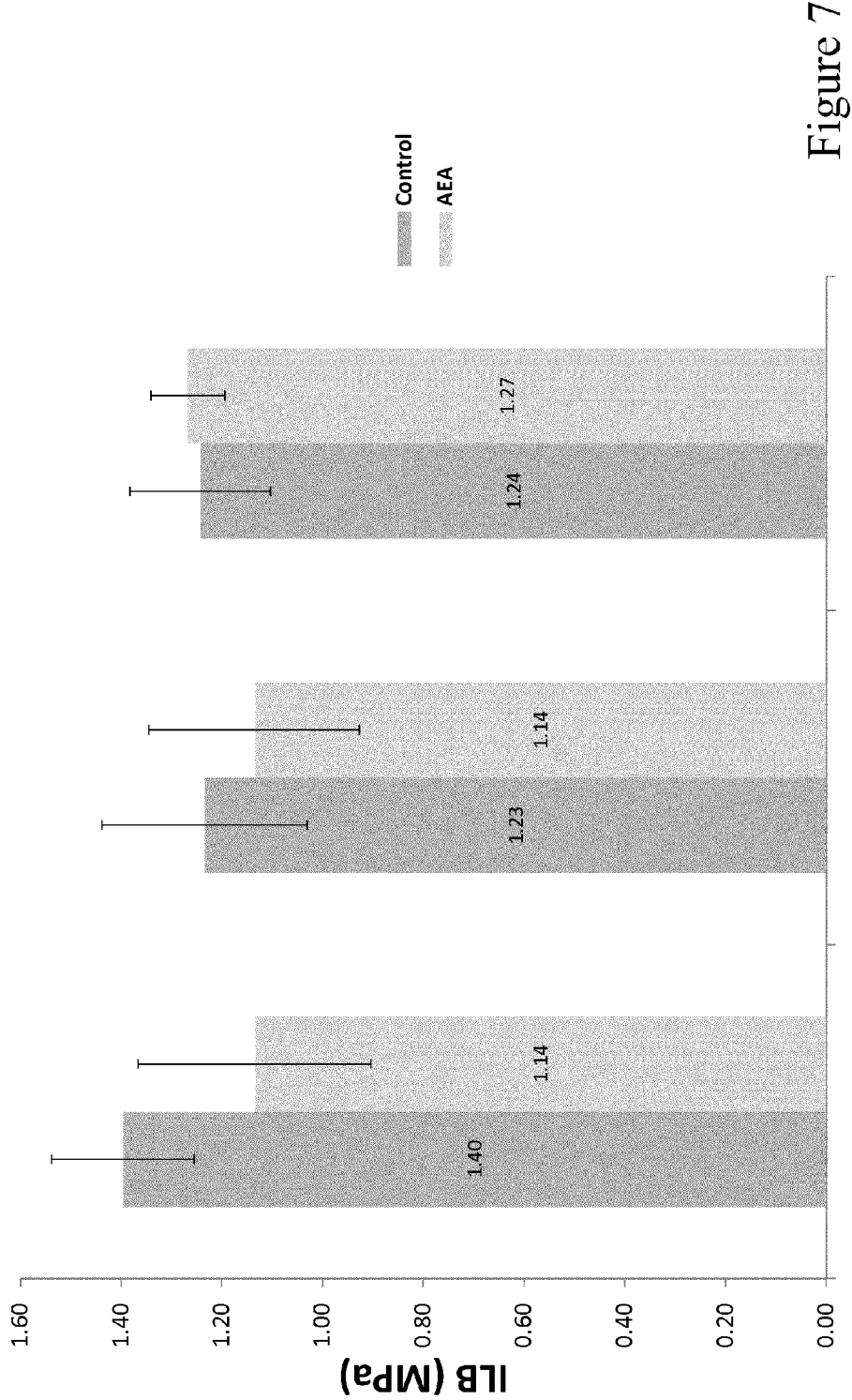
FIG. 7 illustrates the results of ILB testing of an embodiment of a product as compared to a control product.

A comparison of pore distribution in low density fiber cement products that was made by sodium vinsol resin and ceramic microsphere as low density additive with the same density of 1.15 g/cm$^3$ are shown in FIG. 5. As shown, in some embodiments, fiber cement products incorporating aerating agents show a percent increase in pore volume in certain pore size ranges. In one implementation, there is about a 20% volume increase in pores ranging from 0.01 to 0.1 microns in diameter. In another implementation, fiber cement products incorporation aerating agents show a distribution of pore diameters from 0.01 to 0.1 micron, 1 to 10 microns, and 10 to 100 microns. In yet another implementation, the fiber cement products incorporating aerating agents show an average pore diameter of greater than 20 microns, preferably between 20 to 100 microns, constituting at least 50% of the volume of the pores and at least 3% of the volume of the fiber cement product. Furthermore, an addition of 0.5% sodium vinsol resin to total slurry solids by weight was found to produce about a 4% decrease in product the post autoclave density of the fiber cement building sheet and about a 7% decrease in saturated MoR when compared to a control fiber cement building sheet. For the moisture expansion property, building sheets using sodium vinsol resin showed parity to the control building sheets. To understand how the addition of sodium vinsol resin compares to spheres in fiber cement products made by the Hatschek process, we compared the density reduction and performance with 0.5% sodium vinsol resin sampled from this trial and microsphere addition trial. From the analysis, for density reduction 0.5% of sodium vinsol resin to the total solids is equivalent to 3-4% of microspheres addition to the same. In addition Modulus of Rupture (MoR) performance as measured in according to ASTM C 1185, Clause 5 in wet condition shows parity between the two fiber cement building sheets.

Some preferred embodiments also control the size of bubble introduction into the fiber cement slurry. Since smaller bubbles have higher surface tension than larger bubbles, it was found that bubble size within the range of 20 to 100 microns is best to survive the Hatschek process. The process can be engineered by using a high slurry agitation or high slurry pumping rate or introduction of a designated high shear pump for bubble formation.

Sacrificial Fillers

Other preferred embodiments provide a method of manufacturing aerated fiber cement products by careful selection of suitable sacrificial fillers that will be configured to disintegrate during the Hatsheck process, leaving air pockets in the matrix of the end product. A range of potential sacrificial fillers were tested for the Hatschek fiber cement process. The test results are shown in Table 4. The filtration density reduction percentage was calculated by comparing the filter cakes obtained from the vacuum filtration of cement/silica slurry with and without a sacrificial filler. The pad press density reduction percentage was calculated from fiber cement pads produced from a Wabash hydraulic press machine (model PC-75-4TM) using 28 ton/ft$^2$ compression pressure From the results, it was found that only a few selected materials are suitable for aeration purposes.

TABLE 4

Testing of Sacrificial Fillers as potential additives for aerating fiber cement building sheets

| | | Density Reduction | |
|---|---|---|---|
| Variable (addition) | Addition Level | Under filtration | Under Pad Press |
| Acrylic copolymer encapsulating blowing agent | 0.70% | −7.2% | — |
| Polyacrylamide water absorbent polymers | 0.30% | −3.7% | — |
| Carbopol (swelling polymer) | 0.50% | −3.8% | — |
| PVA (PVOH) | 1% | — | — |
| Organic Blowing Agent (Benzene Sulphohydrazide (BSH)) | 0.40% | −4% | — |
| Organic Blowing Agent (Benzene Sulphohydrazide (BSH)) | 0.80% | −12% | — |
| Aluminum Powder | 0.55% | −12.5% | −4% |
| Ammonium Nitrate | 1.50% | −8.5% | — |
| Ammonium Sulfate | 1.50% | −11% | — |
| NaHCO$_3$ | 1.5% Filter cake | −9% | — |
| | 2% Pad Press | | −3.3% |
| NaHCO$_3$ | 6% | −32% | −6% |
| Starch | 1.5% Filter cake | −4.5% | — |
| | 2% Pad Press | | −1.9% |
| Starch | 8% | −28% | −8% |
| Ammonium Bicarbonate | 1.5% Filter cake | −13% | — |
| | 1% Pad Press | | −4.9% |
| Ammonium Bicarbonate | 6% | −42% | −11% |
| Urea | 2% | −7% | −2% |

Combination of Air Entrainment and Low Density Fillers

In some embodiments, a combination of air entrainment with certain low density fillers can be used to reduce the density of a fiber cement product formed by the Hatschek process while still maintaining adequate mechanical properties. By using a combination of air entrainment and certain low density fillers in accordance with the embodiments disclosed herein, density reduction in the product can be achieved in a more cost effective manner than using fillers alone.

In some embodiments, a predetermined amount of one or more density fillers or modifiers such as, for example, lightweight inorganic fillers can be incorporated in a layered fiber cement substrate in combination with a predetermined amount of air bubbles formed by AEA. The air bubbles and fillers are disposed in a packing configuration within each layer such that the air bubbles can effectively replace fillers without affecting the mechanical properties of the product. Therefore, cost effective density modification can be achieved by the simultaneous inclusion of void spaces via air bubble inclusion and lightweight inorganic fillers without sacrificing any physical and mechanical properties. In preferred embodiments, the inorganic fillers are selected so that they do not react with other components in the fiber cement formulation and primarily serve the function of density modification.

Using a combination of AEA and low density fillers according to certain preferred embodiments can lead to significant cost savings. The inventors have found that AEA in combination with selected low density fillers arranged in certain packing configurations within a layered fiber cement substrate can result in substantially the same density reduction and the same or better mechanical properties as an equivalent fiber cement product with low density fillers as the primary means for density reduction. In some implementations, a small amount of AEA can replace a much larger quantity of low density fillers and still maintain substantially the same reduced density and mechanical properties. In one example, 0.5% of formulation weight addition of an AEA, when arranged in a preferred packing configuration, can replace about 50% of formulation weight of low density fillers without adversely affecting the mechanical properties of the final product. Thus, there can be significant cost savings in formulation per volume of product produced. Further, the density modification can be achieved without disrupting the formation of matrix rich layers in a fiber cement product manufactured using the Hatschek process. Moreover, the mechanical properties and handleability of the product can be maintained, despite replacing a significant proportion of closed cell density filler/modifier with entrained air. Additionally, the durability properties of the product can be maintained by modifying the internal structure of the product to include entrained air.

In various embodiments, more than one type of low density fillers can be combined with AEA to modify the density in a fiber cement formulation. In one embodiment, the density modifying agents or low density fillers include a first filler, a second filler and AEA. The preferred ratio of the first filler to the second filler in the formulation is between 1:1 and 1:2.5. Preferably, the first filler has a higher density relative to the second filler. The first filler can have a density of between 0.5 g/cm$^3$ and 1.1 g/cm$^3$, and comprise about 1-15 weight %±0.5 weight % of the total weight of the fiber cement formulation, or about 1.5-9 weight %±0.5 weight % of the total weight of the fiber cement formulation, or about 1.5-3.5 weight %±0.5 weight % of the total weight of the fiber cement formulation. The second filler can have a density of between 0.5 g/cm$^3$ and 1.2 g/cm$^3$, and comprises about 1-10 weight %±0.5 weight % of the total weight of the fiber cement formulation. In some implementations, the second filler comprises 3-4 weight %±0.5 weight % of the total weight of the fiber cement formulation. In some implementations, the second filler can comprise about 3.50 weight %±0.5 weight % of the total weight of the fiber cement formulation. The higher density first filler can be, for example, microspheres. The lower density second filler can be, for example, an inorganic material, such as, diatomaceous earth, slag, granulated blast furnace slag, volcanic ash, expanded clays, expanded vermiculite, expanded perlite, and pumice. In this embodiment of the invention the first and second filler together with AEA are sized such that each of the first and second fillers seat together within a fiber cement product and the AEA is interspersed therebetween. Advantageously, this configuration of the fiber cement product results in substantially the same density reduction and the same or better mechanical properties when compared to an equivalent fiber cement product which has a single low density filler as the primary means for density reduction. Furthermore, the combined percentage weight of the first and second fillers and AEA is less than the percentage weight of the single low density filler, thus substantially lowering the cost of production of the fiber cement product.

Combination of AEA and Microspheres

In some embodiments, the density modifying agents include a combination of AEA and microspheres arranged in a certain packing configuration within a layered fiber cement substrate formed by the Hatschek process. The microspheres can be cenospheres, silicate spheres, borosilicate spheres, aluminosilicate spheres, and the like. The preferred microspheres generally comprise about 30-85% $SiO_2$, 2-45% $Al_2O_3$, up to about 30% divalent metal oxides, and less than 10% alkali metal oxides. Such microspheres generally have a bulk density of less than about 1.4 gm/cm$^3$. In certain preferred implementations, the microspheres have a density of between 0.6 to 0.9 g/cm$^3$ and an average diameter of 30-500 microns. In some implementations, the microspheres comprise a single type of microsphere. In other implementations, the microspheres comprise more than one type of microspheres that fall within the preferred density and size ranges. The AEA can comprise about 0.6-5 weight % of the total weight of the formulation. In some other implementations, the AEA can comprise about 0.45-0.55 weight % of the total weight of the formulation, or about 0.5 weight % of the total weight of the formulation.

The AEA and microspheres can be incorporated into a fiber cement slurry prepared for the Hatschek process to form layered fiber cement substrates. In some embodiments, the formulation of the fiber cement slurry comprises a binding agent, aggregates, fibers, and other additives. The binding agent can be, for example, a hydraulic binding agent such as cement. The binding agent can comprise between about 5-80 weight % of the total weight of the formulation. In some embodiments, the binding agent can comprise about 20 to 50 weight % of the total weight of the formulation. In some embodiments, the binding agent can comprise about 25 to 38 weight % of the total weight of the formulation. In some embodiments, the binding agent can comprise about 26 to 38 weight % of the total weight of the formulation. The aggregate can comprise, for example a siliceous source and an alumina source. Siliceous materials can include sand, quartz rock, fume silica, and manufactured siliceous materials such as calcium silicate hydrate. Combined siliceous and alumina containing materials can include naturally occurring alumina-silicate minerals including clays, felsic minerals, mafic minerals, and ultramafic minerals. Alumina material can include synthetic aluminosilicate minerals such as glass, and heat treated aluminosilicate minerals such as metakaolin. In some embodiments, the aggregate can be ground silica, amorphous silica, silica fume, diatomaceous earth, rice hull ash, blast furnace slag, granulated slag, steel slag, mineral oxides, mineral hydroxides, clays, magnasite, dolomite, metal oxides, metal hydroxides, and mixtures thereof.

The siliceous aggregate can comprise between about 10-60 weight %, or 15-60 weight % of the total weight of the formulation. In some embodiments, the siliceous aggregate can comprise about 40-50 weight % of the total weight of the formulation. In some embodiments, the siliceous aggregate can comprise about 43.7-46 weight % of the total weight of the formulation. The alumina aggregate portion can comprise between about 0-5 weight % of the total weight of the formulation. In some embodiments, the alumina aggregate can comprise about 3.4-3.5 weight % of the total weight of the formulation. In some embodiments, the alumina aggregate can comprise about 3.45 weight % of the total weight of the formulation.

In some embodiments, both alumina and siliceous aggregate are used. In some embodiments, only one of the two is used. In some embodiments, an aggregate material can include both siliceous and alumina aggregate. In some embodiments, the fibers comprise cellulose fibers and/or polypropylene fibers. In some embodiments, cellulose fibers are refined to a degree of freeness of between 20 and 800 Canadian Standard Freeness (CSF), more preferably 200 to 500 CSF. Other forms of fibers may be used, examples of which include, but are not limited to, ceramic fiber, glass fiber, mineral wool, steel fiber, and synthetic polymer fibers such as polyamides, polyester, polypropylene, polymethylpentene, polyacrylonitrile, polyacrylamide, viscose, nylon, PVC, PVA, rayon, glass ceramic, carbon, or any mixtures thereof. Useful reinforcing cellulose fibers may also include chemically treated cellulose fibers, such as fibers treated with hydrophobicity agents, biocides, or other chemicals.

The fibers can comprise between about 5-15 weight % of the total weight of the formulation. In some embodiments, the fibers can comprise about 7-8 weight % of the total weight of the formulation.

In some embodiments, additives can be added into the mixture. For example, dispersing agents, fire retardant, viscosity modifiers, thickeners, pigments, colorants, dispersants, flocculating agents, water-proofing agents, natural and synthetic minerals polymeric resin emulsions, hydrophobic agents, or mixtures thereof can be used. Water can further be added into the mixture to form a slurry. Water can be added in sufficient quantities to make a slurry viscosity suitable for a selected forming process.

EXAMPLES

Table 5 shows fiber cement formulations A, B and C for slurries used in a Hatschek process. Formulation A utilizes no AEA and only microspheres as modifying agents, while Formulation B utilizes a combination of microspheres and AEA to reduce the density of the final product. As shown in Table 5, in Formulations B and C, about 0.5 wt. % and 0.18 wt % of AEA is added respectively and about 3 to 4 wt % of low density additive filler. It is to be understood that the formulations A, B and C are provided without any tolerances and when tolerances are taken into consideration the formulation will sum to 100 weight %.

TABLE 5

| Ingredients | Formulations | | |
| --- | --- | --- | --- |
| | A | B | C |
| Cement | 28% | 28% | 28% |
| Aggregate | 58-59% | 61% | 61% |
| Cellulose | 7% | 7% | 7% |
| Microspheres | 6-7% | 3% | 3% |
| AEA | 0 | ~0.5% | ~0.18% |

Figure 8B:
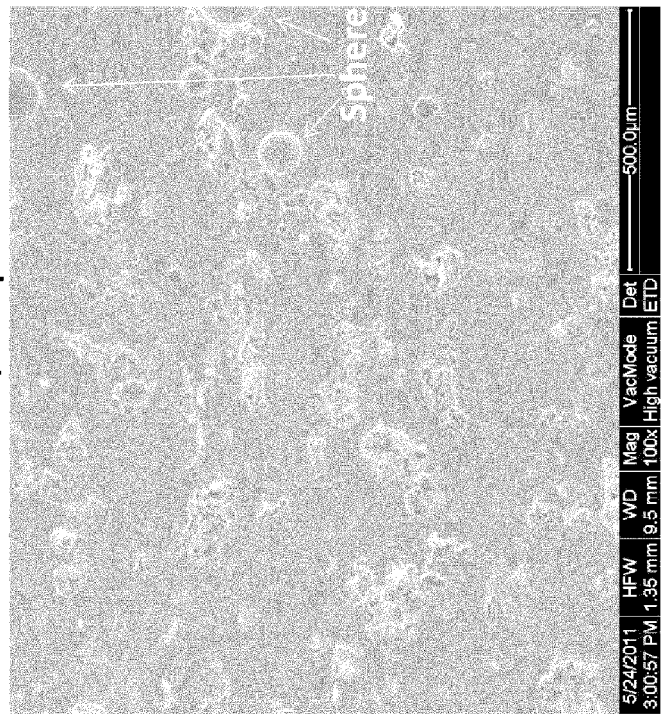
FIGS. 8A-B show SEM photographs at 100× magnification of an embodiment of a product as compared to a control product.
Figure 8A:
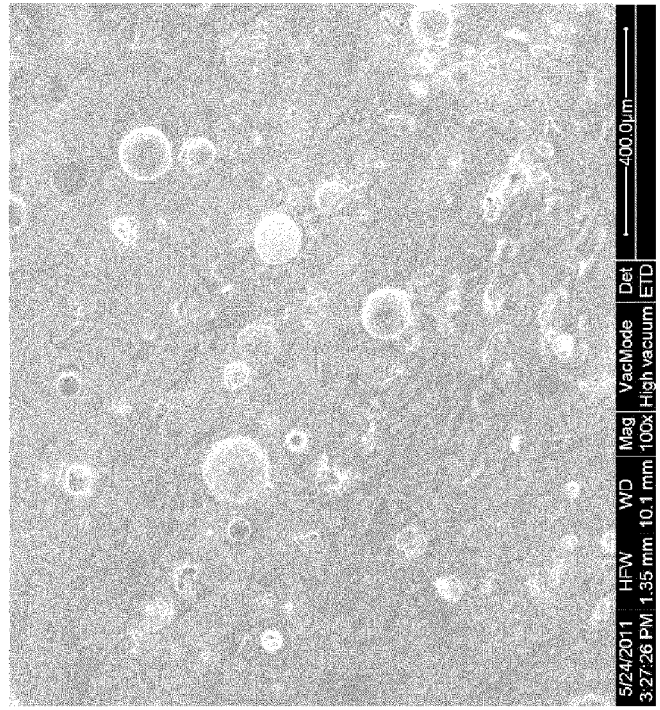

FIG. 8A provides an SEM image of a fiber cement product having 6 wt. % microspheres as density modifier and no AEA. FIG. 8B provides an SEM image of an equivalent fiber cement product having 3 wt. % microspheres and 0.5 wt. % AEA as density modifiers. The microspheres in both samples have diameters of approximately 150 μm. A comparison of the images show that the sample incorporating AEA also includes air bubbles having a diameter of about (replace with 0.5-50 μm), which creates voids in the fiber cement similar to microspheres.

Further testing was done for combinations of microspheres and AEA. Table 8 shows the composition of a product using different levels of microspheres and AEA.

TABLE 8

Compositions showing different AEA levels

| Ingredients | Ctrl 1 | Ctrl 2 | 0.5% AEA 4% Sphere Percentages | 2% AEA 0% sphere | 0.13% AEA 1% sphere |
| --- | --- | --- | --- | --- | --- |
| Cement | 38.2% | 28.4% | 28.4% | 38.2% | 38.2% |
| Aggregate | 51.4% | 54.7% to 55.6% | 58% | 53.4% | 52.4% |
| Cellulose | 7.8% | 7.0% | 7.0% | 7.8% | 7.8% |
| Additive | 0.6% | Balance | Balance | Balance | 0.47% |
| LDA MicroSphere | 2% | 7% | 4% | 0% | 1% |
| AEA | — | | 0.5% | 2% | 0.13% |

Table 9 below illustrates the physical properties of a control product having all microspheres, a product having a combination of microspheres and AEA, and a product having only AEA.

TABLE 9

Physical Properties for Different AEA Combinations

| Test | Ctrl 1 | Ctrl 2 | 0.5% AEA 4% sphere | 2% AEA 0% sphere | 0.13% AEA 1% sphere | 0.25% AEA |
| --- | --- | --- | --- | --- | --- | --- |
| MoR Sat | 10.8 | 7.6 | 7.1 | 7.1 | 10.9 | 11 |
| Strain Sat | 7441 | | | | 8913 | 8482 |
| GS (Green Sheet) Density | | 1.12 | 1.13 | 1.1 | | |
| Oven Dried Density | 1.27 | | | | 1.26 | 1.27 |

Combination of AEA and Expanded Perlite

In some embodiments, the density modifying agents include a combination of AEA and expanded perlite arranged in a certain packing configuration within a layered fiber cement substrate formed by the Hatschek process. Table 11 illustrates the composition of different fillers used in the testing boards. In the examples provided in Table 11, the formulation of the fibre cement article remains substantially the same with the exception of the type and % weight of the low density fillers. In the first and second examples, perlite is used to replace microspheres. In Example 1, the percentage of perlite in the perlite only composition corresponds to approximately 80% of the microsphere control dosage while in the perlite and 0.3% AEA composition, the perlite dosage corresponds to approximately 87% of the microsphere+0.3% AEA control dosage.

In Example 2, the percentage of perlite in the perlite only control composition corresponds to approximately 65% of the microsphere control dosage while in the perlite and 0.3% AEA composition, the perlite dosage corresponds to approximately 44% of the microsphere control dosage.

TABLE 11

Compositions using Microspheres and/or Perlite

| Formulation | Sphere or Perlite dosage (%) Example 1 | Sphere or Perlite dosage (%) Example 2 |
|---|---|---|
| Microsphere Control | 5.5 | 5.2 |
| Perlite Only | 4.4 | 3.4 |
| Microsphere + 0.3% AEA Control | 3.0 | — |
| Perlite + 0.3% AEA | 2.6 | 2.3 |

Table 12 shows the density and of boards formed using microspheres, perlite, or perlite with AEA. As shown, the use of perlite and AEA can retain significantly the same density as that of microsphere or perlite alone.

TABLE 12

Density

| Formulation | Wet Density Example 1 | Dry Density Example 1 | Wet Density Example 2 | Dry Density Example 2 |
|---|---|---|---|---|
| Microsphere Control | 1.60 | 1.12 | 1.61 | 1.13 |
| Perlite Only | 1.62 | 1.12 | 1.63 | 1.15 |
| Perlite + 0.3% AEA | 1.63 | 1.14 | 1.63 | 1.16 |

TABLE 13 shows the post autoclave test results of mechanical properties for Examples 1 and 2 of Table 11.

TABLE 13

Mechanical Properties using Perlite

| | MOR | | Post Autoclave Dry Density | |
|---|---|---|---|---|
| Test | Example 1 | Example 2 | Example 1 | Example 2 |
| Microsphere Control | 8.5 | 6.71 | 1.19 | 1.19 |
| Perlite Only | 7.2 | 6.31 | 1.15 | 1.18 |
| Perlite + 0.3% AEA | 8.0 | 6.42 | 1.17 | 1.21 |

Accordingly, the combination of perlite and AEA can achieve similar mechanical properties than perlite on its own.

Combination of AEA, Expanded Perlite, and Microspheres

In some embodiments, the density modifying agents include a combination of AEA, expanded perlite, and microspheres arranged in a certain packing configuration within a layered fiber cement substrate formed by the Hatschek process.

Tables 14 and 15 show formulations that can be used for embodiments of the disclosure that include multiple fillers as well as AEA.

TABLE 14

Compositions

| | Formulation | | |
|---|---|---|---|
| Component | Control (A3) Weight % | Combination 1 (D3) Weight % | Combination 2 (D4) Weight % |
| Pulp | 7 | 7 | 7 |
| Cement | 36 | 38 | 37 |
| Aggregate | 44 | 46 | 45 |
| Total Additives | Balance | Balance | Balance |
| Microsphere | 9 | 1.5 | 3.5 |
| Expanded Perlite | 0 | 3.5 | 3.5 |
| AEA | 0 | 0.50 | 0.50 |
| Total Weight | 100 | 100 | 100 |

TABLE 15

Compositions

| | Formulation | |
|---|---|---|
| Component | Combination 1 Weight % | Combination 2 Weight % |
| Pulp | 5-15 | 5-15 |
| Cement | 25-38 | 25-38 |
| Aggregate | Less than 50 | 44-50 |
| Total Additives | Balance | Balance |
| Microsphere | 1.5-3.5 | 3.5 |
| Expanded Perlite | 3-8 | 3-8 |
| AEA | 0.1-0.5 | 0.50 |
| Total Weight | 100 | 100 |

Figure 9:
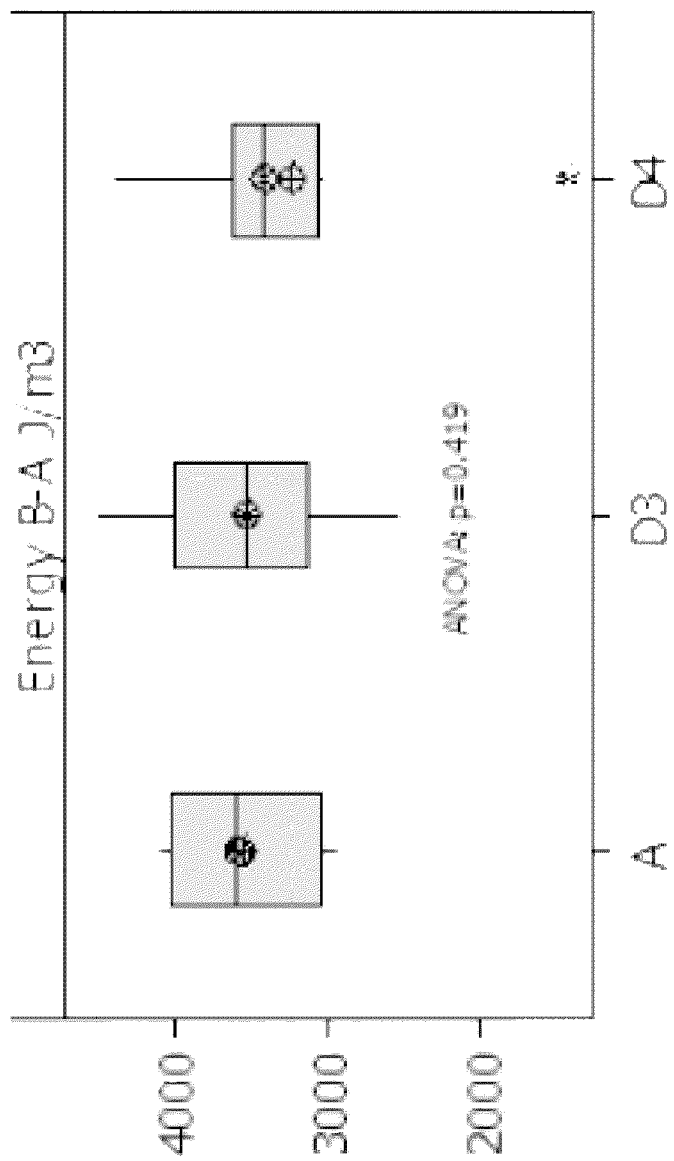
FIG. 9 illustrates flexural strength (expressed as modulus of Rupture (MoR), toughness, modulus of elasticity and strain control of an embodiment of a product as compared to a control product.
Figure 10:
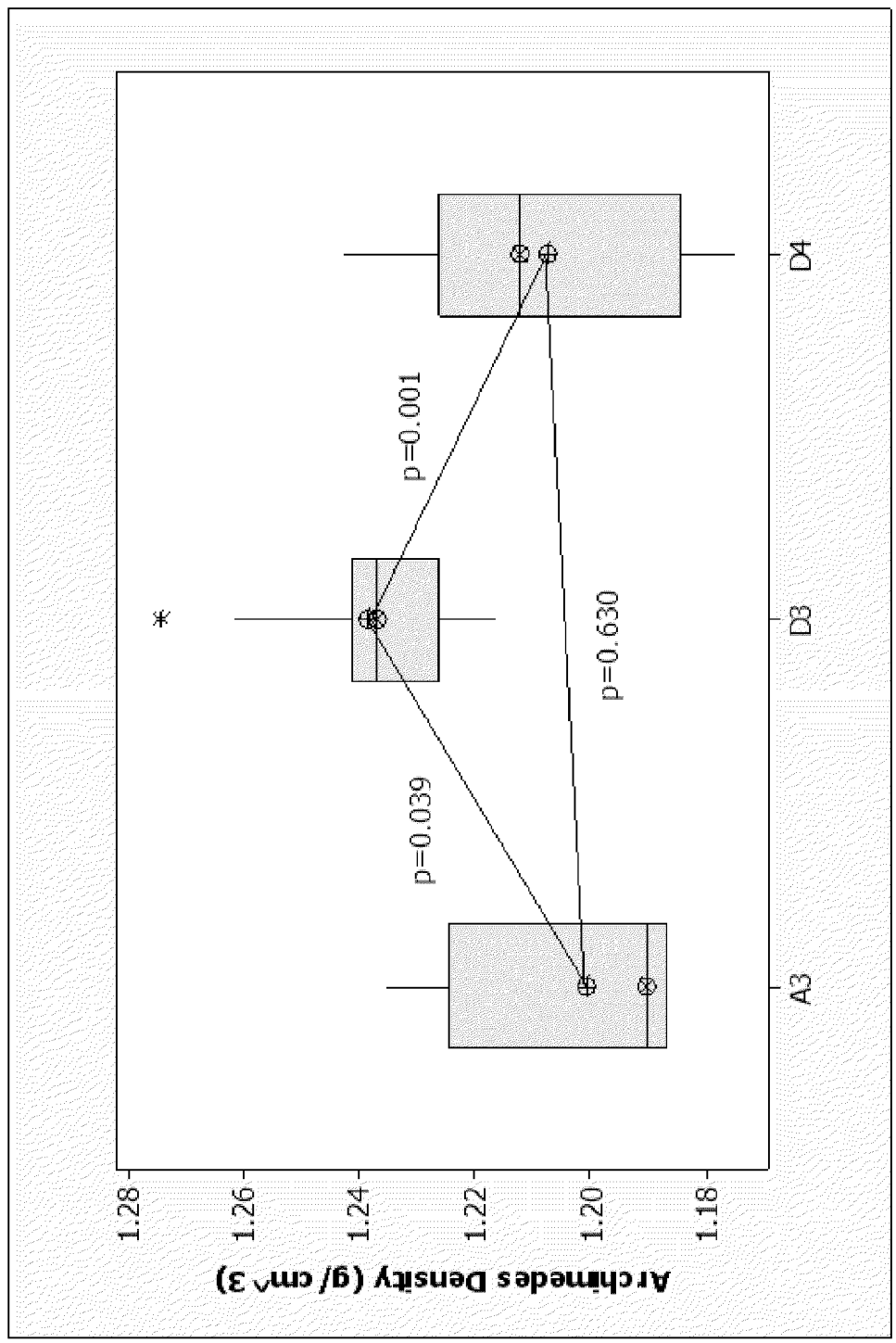
FIG. 10 illustrates Archimedes Density of an embodiment of a product as compared to a control product.

FIGS. 9-10 illustrate different mechanical properties of embodiments of a product as discussed in the composition table 14 above. As shown, by incorporating perlite and AEA, the mechanical properties can remain approximately the same as when using microspheres alone.

TABLE 15

Physical Properties for AEA Combinations from Table 14

| Category | Test | Ctrl A3 | D3 | D4 |
|---|---|---|---|---|
| Physical Properties | Density | 1.2 | 1.24 | 1.21 |

Processing

Figure 11:
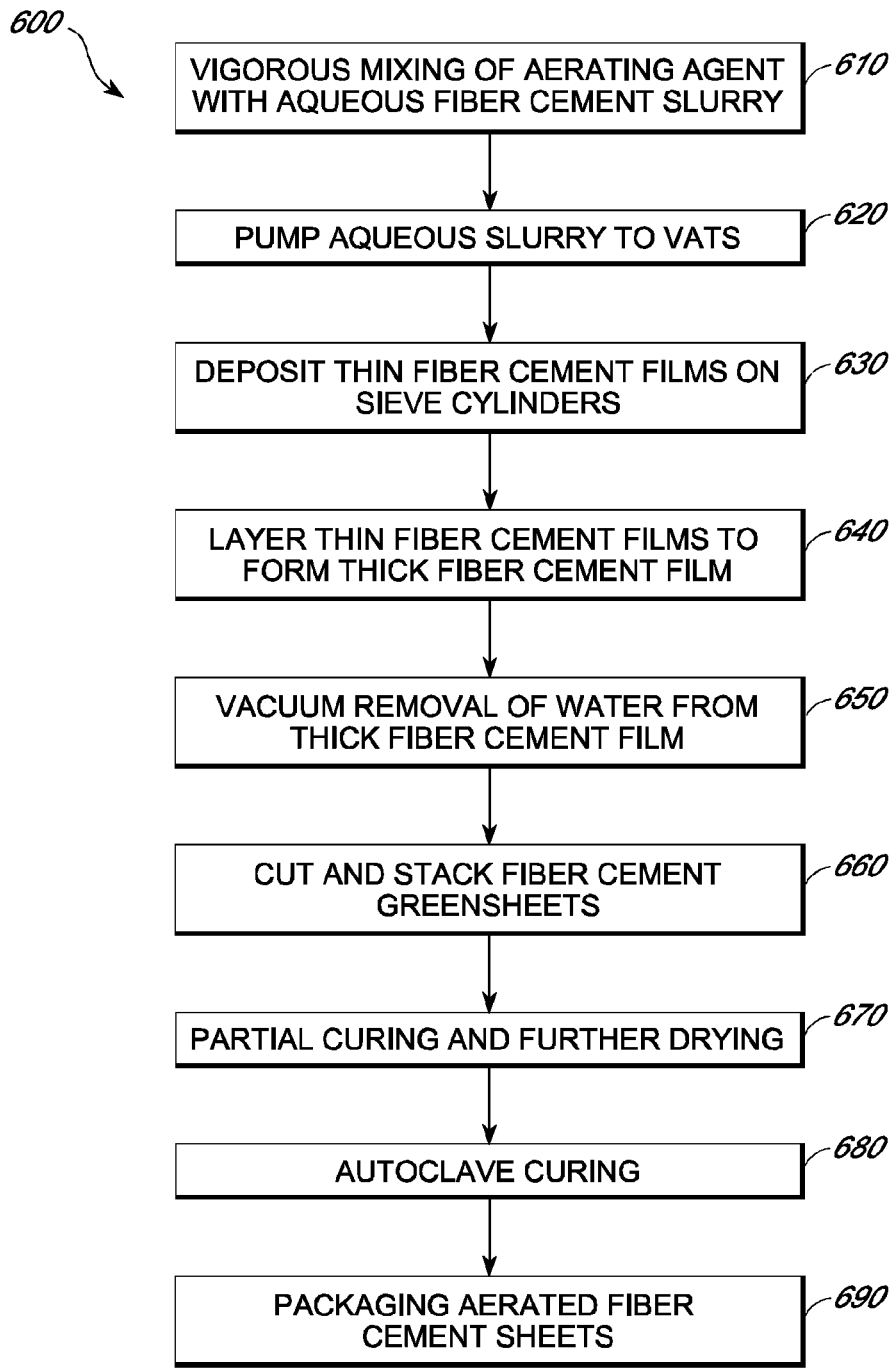
FIG. 11 is a schematic illustration of a process flow of one embodiment for manufacturing a low-density aerated fiber cement sheet in conjunction with the Hatschek process.

FIG. 11 illustrates a process 600 for forming a low density, aerated fiber cement article using the Hatschek process. The process 600 is designed to entrain air in a fiber cement matrix such that the air voids formed therein are uniform, predictable and can survive the harsh conditions of the Hatschek process. In this embodiment, air is entrained in the fiber cement panel to form the air voids during the Hatschek process. The process 600 begins with Step 610 in which one or more aerating agents is vigorously mixed with an aqueous slurry comprising water, cellulose fiber, silica, cement and additives, including low density additives. In one implementation, the aqueous slurry contains about 8 to 15% solids by weight, with the cement accounting for about one-third of the total solids by weight. In some embodiments, the aqueous slurry can be mixed by a shear pump at a speed of greater than 450 rpm or preferably greater than 500 rpm. The water to cement ratio for the aqueous slurry can be around 20-35. The aerating agent is preferably vinsol resin, more preferably sodium vinsol resin, comprising about 0.3 to 2 wt. % of the aqueous slurry. The inventors have surprisingly found that aerating agents, when present in this weight percent range, provide desirable buffering and other properties in the fiber cement matrix. The aerating agent can be added directly to the aqueous slurry in this embodiment. In some implementations where microspheres or other low density additives are typically used to reduce density of the fiber cement article, aerating agents can be added, in combination with microspheres to reduce the amount of microspheres needed, hence reducing the cost of the material. In one implementation, the aerating agents comprise about 0.1-0.2 wt %, preferably 0.13 wt. % of the fiber cement formulation and microspheres comprise about 0.1 wt. % of the fiber cement formulation.

The process 600 continues with Step 620 in which the aqueous slurry containing the air bubbles is delivered to a feed sump and pumped to a plurality of vats. Each vat has its own agitators to ensure a consistent slurry mixture. The fiber cement material in the aqueous slurry in the vats is then deposited as thin fiber cement films on a plurality of sieve cylinders that are rotated through the slurry in the vats in Step 630. The thin fiber cement films are then layered on top of each other to produce a thicker fiber cement layer in Step 640. The process 600 produces the thicker fiber cement layer from the thin fiber cement films by the use of a specialized felt-based belt that both drives the rotating sieve cylinders through the slurries in the vats and picks up the thin fiber cement films deposited on the rotating sieve cylinders.

The rotating sieve cylinders can be rotated by the bottom run of the specialized felt-based belt and filter the slurry through a sieve screen attached to the sieve cylinder. As the slurry filters through this sieve screen a thin film layer of fiber cement material is deposited on the surface. The thin film of fiber cement material has a thickness of between 0.20 to 0.45 mm (20-450 μm) and contains between 60%-75% solids (with a water to cement ratio of 1.4 to 2.2 when cement comprises 30% of the solids). The excess water from the slurry then passes through the sieve screen as filtrate and exits from the end of the sieve cylinder, enabling recovery and recirculation of the slurry solids in the vat. As the apertures of the sieve screen are typically between 0.30 to 0.50 mm (300-500 μm) all non-fibrous material that is significantly smaller than 300 μm is either washed through the sieve screen or caught by the cellulose fibers that form a mesh over sieve screen. Accordingly entrapment of small non-fibrous materials depends on the formation of an initial filter layer of cellulose fibers on the surface of the sieve screen.

The fiber cement film formed on the surface of the sieve screen on each sieve cylinder is then transferred upon contact to the outer surface of the specialized felt-based belt. This transfer process takes place because the felt is less porous than the sieve screen. As the specialized felt-based belt passes over each successive vat in the series it picks up a corresponding series of sequential layers of fiber cement films from the associated sieve cylinders and builds the thicker fiber cement layer. Thereafter the thicker fiber cement layer passes over a vacuum box positioned along the top run of the belt to remove the water and moisture still present in Step 650. Given the thickness of the thicker fiber cement layer and the water content present the vacuum settings can range from 18 to 25 inches of mercury.

The thicker fiber cement layer then passes between a tread roller, which also provides the driving force for the specialized felt-based belt, and an adjacent accumulation or "size" roller in the form of a relatively large diameter drum. The tread and size rollers are positioned such that further water is pressed out of the thicker fiber cement layer while it is transferred to the size roller by a mechanism similar to that by which it was previously transferred from the sieve cylinders to the belt. The pressure in the nip between the tread and size roller, also referred to as the nip pressure, is anywhere between 350 psi to 1000 psi depending on the processing requirements. Preferably, the pressure is selected so as to not remove a minimal number of air bubbles in the fiber cement layers. The size roller accumulates a number of thicker fiber cement layers according to the number of turns allowed before the laminated sheet is cut off. Thus, the formation of a fiber cement sheet with multiple thin substrate layers is achieved by allowing a larger number of turns before cutting the film. In the cut off process in Step 660, a wire or blade is ejected radially outwardly from the surface of the size roller to cut longitudinally the cylinder of laminated fiber cement material that has cumulatively formed on the surface of the roller.

Once cut, the sheet of laminated fiber cement material peels off the size roller to be removed by a run-off conveyor. The material at this stage has the approximate consistency of wet cardboard, and therefore readily assumes a flat configuration on the run-off conveyor. To complete the process at the wet end, the felt is cleaned as it passes through an array of showers and vacuum boxes, before returning to the vats to pick up fresh layers of film. It will be appreciated that the quality and characteristics of laminated sheet material produced from the process depends on a wide range of variables associated with the slurry formulation and the various settings at the wet end of the machine. Further down the process line this material, known as "green sheet", is roughly trimmed to size at a green trim station using high pressure water jet cutters, after which it proceeds as individual sheets to a stacker. At the stacker, the green sheets are picked up by vacuum pads and formed with interleaving sheets into autoclave packs. After partial curing, and optionally a further compression process to increase density, the green sheets are loaded into an autoclave unit for final curing under elevated temperature and pressure conditions in Step 670. In the autoclave, a chemical reaction occurs between the raw materials to form a calcium silicate matrix which is bonded to the cellulose reinforcing fiber. This process is undertaken in 160-190° C. at saturated steam pressure for 8 to 12 hours. At its completion, the sheets emerge fully cured, ready for accurate final trimming, finishing and packing in Step 680. The resulting product is an aerated, low-density fiber cement panel or sheet with multiple overlaying substrate layers. The fiber cement panel has air bubbles evenly distributed throughout the fiber cement matrix. The air bubbles are preferably closed-cell and have an average diameter ranging from 10 to 100 μm. In some embodiments, over 80% of the air bubbles are closed-cell. In some other embodiments, over 90% of the air bubbles are closed-cell.

Figure 12:
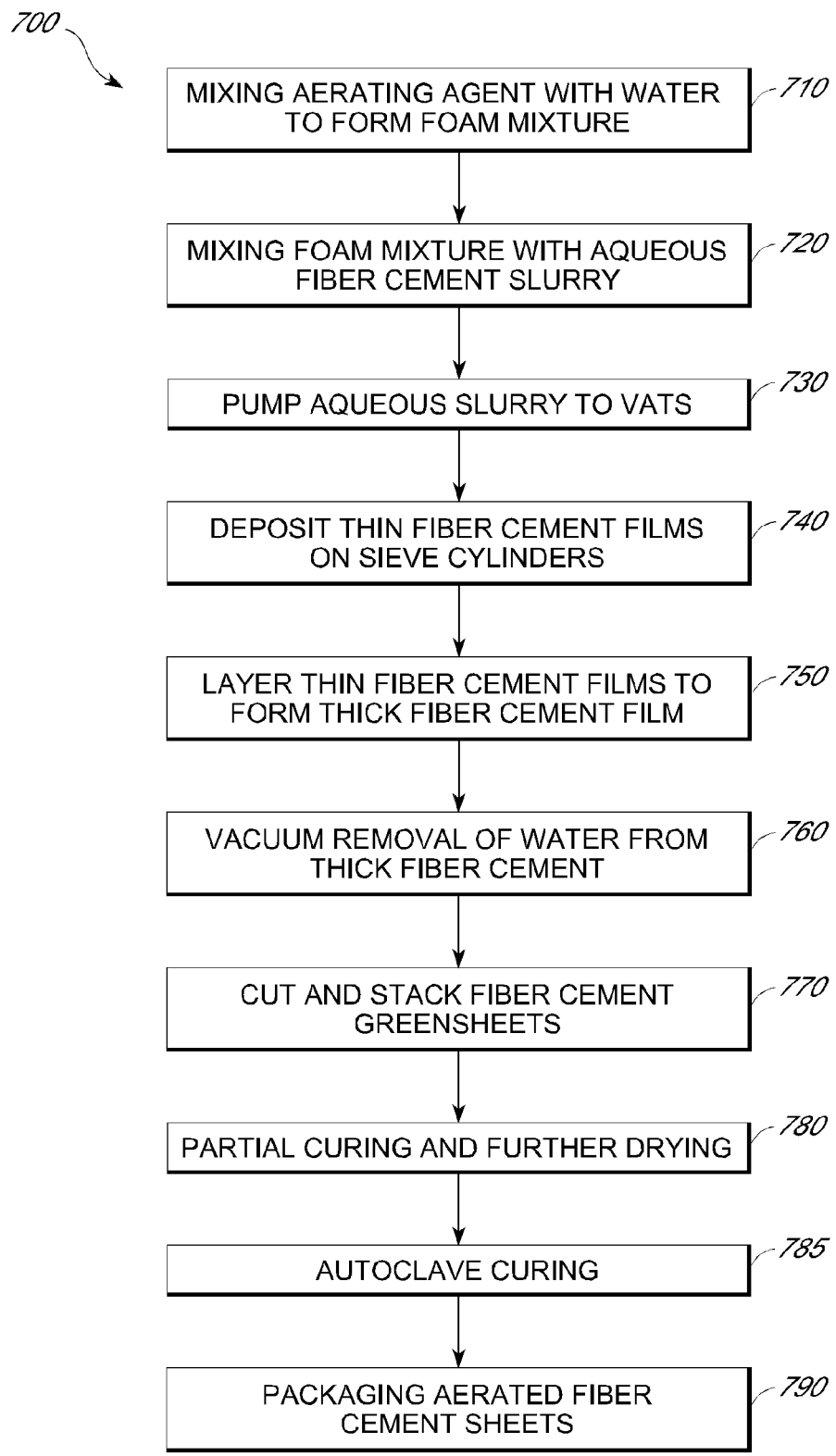
FIG. 12 is a schematic illustration of a process flow of another embodiment for manufacturing a low-density aerated fiber cement sheet in conjunction with the Hatschek process.

FIG. 12 illustrates another process 700 for forming a low density, aerated fiber cement article using the Hatschek process. In process 700, instead of adding the aerating agent directly to aqueous fiber cement slurry, the aerating agent is first mixed with water, and optionally other additives, using a high shear pump to form a foam mixture in Step 710. The foam mixture is then added to and mixed with the aqueous cement slurry in Step 720. Premixing the aerating agent with water can result in more uniformly distributed air bubbles once the foam mixture is added to the aqueous slurry.

Figure 13:
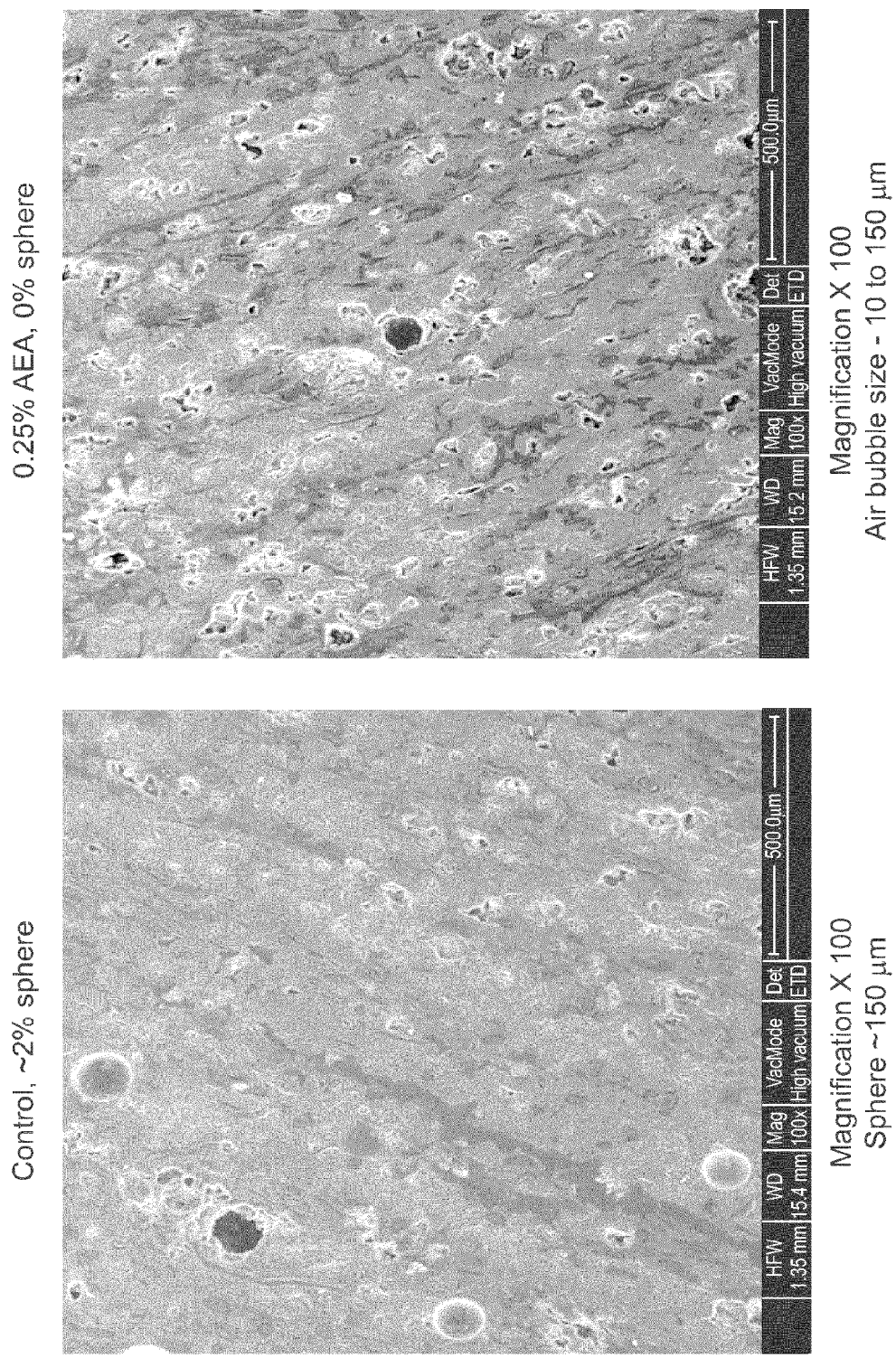
FIG. 13 are SEM photos comparing an aerated low-density fiber cement sheet of one preferred embodiment with a control low-density fiber cement sheet made with microsphere additives.

FIG. 13 are SEM photos comparing an aerated low-density fiber cement sheet made in accordance with the methods described herein with a control low-density fiber cement sheet made with microsphere additives. As shown in FIG. 13, the size of the air bubbles in the aerated fiber cement sheet are controlled maintained in the range of between 10 to 150 µm, which is comparable to the size of the microspheres. However, the aerated fiber cement sheet is less costly to manufacture as it does not require the addition of microsphere or other additives to create uniformly distributed air voids in the fiber cement matrix.

From the foregoing description, it will be appreciated that an inventive product and approaches for aerated fiber cement materials are disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A building article comprising: a plurality of thin film overlaying fiber cement substrate layers, wherein each of said overlaying fiber cement substrate layer is bonded to an adjacent overlaying substrate layer, the fiber cement substrate layers together forming a single fiber cement matrix wherein said fiber cement matrix comprises an air entrainment agent; a first plurality of filler particles having a first density and incorporated in the fiber cement matrix, wherein the first plurality of filler particles comprises about 0.1%-5% by volume of the fiber cement matrix; a second plurality of filler particles having a second density and incorporated in the fiber cement matrix, wherein the second plurality of filler particles have an average density less than the average density of the first plurality of filler particles; and a plurality of air voids formed by the air entrainment agent defined by air pockets entrained in the fiber cement matrix such that the air voids are formed directly in the fiber cement matrix with no material separating the air voids from the fiber cement matrix, wherein the air voids comprise about 3%-20% by volume of the fiber cement matrix, wherein the air voids are closed cell and have an average diameter greater than 20 microns, and wherein the air voids are uniformly distributed.

2. The building article of claim 1, wherein the first plurality of filler particles comprise microspheres.

3. The building article of claim 1, wherein the second plurality of filler particles comprise perlite.

4. The building article of claim 1, wherein the average diameter of the air voids is between 20 microns to 100 microns.

5. The building article of claim 4 comprising a fiber cement formulation, the fiber cement formulation comprising:
less than 50% by weight of a siliceous aggregate;
about 25%-38% by weight of a hydraulic binding agent;

about 5%-15% by weight of cellulose fibers;
about 1.5%-3.5% by weight of hollow microspheres;
about 3%-8% by weight of expanded perlite;
about 0.1%-0.5% by weight of an air entrainment agent; and
a hollow microsphere to air entrainment agent ratio between about 3 and 35.

6. The fiber cement formulation of claim 1, wherein the formulation comprises about 1.5% by weight of hollow microspheres, about 3.5% by weight of expanded perlite, and about 0.5% by weight of the air entrainment agent.

7. The fiber cement formulation of claim 1, wherein the formulation comprises about 3.5% by weight of the hollow microspheres, about 3.5% by weight of the expanded perlite, and about 0.5% by weight of the air entrainment agent.

8. The fiber cement formulation of claim 1, wherein the air entrainment agent is selected from the group consisting of salts of wood resin, synthetic detergents, salts of sulfonated lignin, salts of petroleum acids, salts of proteinaceous material, fatty and resinous acids and salts thereof, alkylbenzene sulfonates, salts of sulfonated hydrocarbons, and combinations thereof.

9. The fiber cement formulation of claim 1, wherein the air entrainment agent comprises vinsol resin.

10. The fiber cement formulation of claim 1, wherein the air entrainment agent comprises a sacrificial filler.

11. The fiber cement formulation of claim 1, wherein the air entrainment agent forms a plurality of closed-cell voids interspersed between the microspheres and expanded perlite.

* * * * *